United States Patent [19]
Cortes

[11] Patent Number: 6,045,406
[45] Date of Patent: Apr. 4, 2000

[54] CONNECTOR WITH PROTECTION FROM RADIATED AND CONDUCTED ELECTROMAGNETIC EMISSIONS

[75] Inventor: Nestor Eduardo Cortes, Wilton, Conn.

[73] Assignee: Omega Engineering, Inc., Stamford, Conn.

[21] Appl. No.: 09/103,586

[22] Filed: Jun. 24, 1998

Related U.S. Application Data

[60] Provisional application No. 60/051,055, Jun. 27, 1997.

[51] Int. Cl.[7] .................................................. H01R 13/66
[52] U.S. Cl. ............................................................. 439/620
[58] Field of Search ............................................... 439/620

[56] References Cited

U.S. PATENT DOCUMENTS

| | | | |
|---|---|---|---|
| 5,022,870 | 6/1991 | Sakamoto et al. | 439/608 |
| 5,183,420 | 2/1993 | Hollander et al. | 439/457 |
| 5,213,522 | 5/1993 | Kojima | 439/620 |
| 5,246,387 | 9/1993 | Liebich et al. | 439/620 |
| 5,286,221 | 2/1994 | Fencl et al. | 439/607 |
| 5,833,496 | 11/1998 | Hollander et al. | 439/620 |

*Primary Examiner*—Gary F. Paumen
*Assistant Examiner*—Truc Nguyen
*Attorney, Agent, or Firm*—William A. Drucker

[57] ABSTRACT

This invention provides electrical connectors, particularly for devices having a low signal level which might be adversely affected by stray radiated and/or conducted electromagnetic emissions, for example thermocouple sensor circuits. The connector has terminal means for attachment of an electrical lead, connecting means for engagement electrically with mating conductive means of an electrical component, and a block of ferrite material, through which the or each connecting means is engaged so as to provide complete protection by the ferrite material against interference by electromagnetic radiation.

2 Claims, 5 Drawing Sheets

CONNECTOR WITH PROTECTION FROM RADIATED AND CONDUCTED ELECTROMAGNETIC EMISSIONS

This application claims benefit of provisional 60/051055, filed Jun. 27, 1997.

This disclosure contains no right to any inventions made under federally-sponsored research and development.

BACKGROUND OF THE INVENTION

1. Field of the Invention

This invention relates generally to connectors, whether single conductor or multiple conductor, and whether intended for use as single connector items, e.g. for making a separable connection to a piece of electronic apparatus, or as a part or parts of a multiple-part line connector assembly e.g. male and female interconnecting plug and socket items.

More specifically, the invention relates to connectors which provide for suppression of radiated and/or conducted electromagnetic emissions which would be detrimental to proper use of apparatus in which the connector is included. In particular the invention is applicable to fields of use wherein there is necessity for including an electrical or electronic circuit or device having a relatively low signal level which might be adversely affected by such stray emissions, for example thermocouple sensor circuits.

2. Description of the Prior Art

In the prior art of connectors there are disclosures of the use of ferrite material in the following:

(I) U.S. Patents assigned to AMP Inc: U.S. Pat. Nos. 4,699,590, 4,359,620, 3,789,263, Re 29,258, 3,735,705, 3,987,380, 4,036,800.

(II) U.S. Patent assigned to The Whitaker Corp: U.S. Pat. No. 5,219,305.

(III) U.S. Patent William Baird Fritz U.S. Pat. No. 3,743,978.

(IV) U.S. Patent assigned to Stanford Research Institute and Amplex Corporation: U.S. Pat. No. 3,533,948.

(V) Un-examined Japanese Patent Application, AMP Inc., 90-032246/05 JO 1279-584-A discloses an electrical connector which has a noise filter with a ferrite head fitted to a terminal lead fonned by a central conductor of a feed-through capacitor.

(VI) German Patent assigned to AMP Inc., Auslegeschrift No. 2,058,419 discloses a method for the manufacturer of a high frequency filter from a ferrite tube, which is in the form of a highly compressed tube and which is bonded on its outer surface with a covering of dielectric material, the layer of dielectric material carrying an electrode in the form of a metallic outer sleeve, and a further electrode is provided in similar manner on the inside of the ferrite tube, characterised in that the covering (6) of dielectric material is laid down directly into the outer surface of the ferrite tube (5) by electrophoresis.

SUMMARY OF THE INVENTION

It is known that electrical signals carried by connectors, or adjacent apparatus, may be subject to electromagnetic interference as the result of induced signals picked up from the electromagnetic radiation of adjacent electrical equipment. Such interference results from the leads, to the connector or within the connector, acting as an antenna which senses stray electromagnetic radiation.

Various efforts have been made to avoid or suppress the result of such interference, but such efforts have been found to be inconvenient and/or expensive to implement or both. For example, it has been found in the past that interference from stray signals can be avoided by encapsulating leads in sheaths of RFI (radio frequency interference shielding) material, or by determining the strength of nearby stray signal fields and then moving all such nearby sources to a physical distance from the leads that has been calculated to prevent possibility of undesired signals being picked up by electromagnetic induction. It can be seen, readily, that such preventive methods and techniques are indeed costly and inconvenient. Other attempts to reduce or avoid interference from stray signals have involved the use of ferrite cores. Hitherto such uses have in some cases required additional circuit elements, such as insertion of a jumper cable having a permanently-included ferrite core, in series with the main conductors in the circuit; or awkwardly and inconveniently surrounding one or more of the circuit conductors with separately applied ferrite cores. Again, it is known to use ferrite beads mounted conveniently on circuit boards or molded into connectors used with computer monitors.

It is established practice, in industries that make use of thermocouple sensors, to couple the sensor into a related electrical circuit by means of an electrical connector. When for example thermocouples are connected to instruments such as panel meters, controllers and transmitters, the input signal from the sensor or transducer usually travels substantial distances along fine gauge electrically conductive wire leads. The length and nature of such leads and the environment in which they must function often create conditions that favour occurrence of stray emissions. In many cases, the leads or signal wires from a sensor or thermocouple are first attached, for convenience, to an electrical connector, for coupling to an instrument or the like. As soon as the conductors of the connector are electrically coupled to the circuit, stray EMI emissions may be conducted into the circuit. Of particular importance are thermocouple connectors, which are particularly susceptible because of the long lead conductive path of the conductors themselves and the high input impedance of the instrumentation.

The term "ferrite" as commonly understood in the electronics field, denotes a particulate material having one or more oxides of iron in particulate form in a carrier. This usage of the term "ferrite" is to be distinguished from the usual dictionary definition which is a generic name for a number of oxides of iron. In this specification, the term "ferrite" is to be understood as including within its scope any suitable material having an absorption and/or shielding effect as concerns electromagnetic waves which may be emitted at or adjacent to a zone of completion of an electrical circuit. Known ferrite elements consist of ferrite material sintered into a convenient shape. Other known "ferrite" materials for the suppression of electromagnetic interference are nickel-zinc compositions and manganese-zinc materials, of different compositions to permit selection of an optimum type for a given application; pressed parts, components, and powders are known.

OBJECTS OF THE INVENTION

Accordingly it is an object of this invention to provide means associated with an electrical connector that is capable of filtering stray signals which may be induced in the lead or leads of the connector.

It is another object of this invention to provide apparatus which eliminates the effects of undesired stray signals in circuits which include a connector or connectors, that is uncomplicated in design, and that is relatively simple and inexpensive to produce.

It is still another object of this invention to provide means associated with an electrical connector, for eliminating the effects of undesired stray signals in the circuit or circuits in which the connector is included that is easily adaptable to single lead or multi-lead connectors.

Another and further object of this invention is to provide means associated with an electrical connector for eliminating the effects of undesired stray signals in its circuit or circuits, that can be manufactured easily in various configurations to accommodate differing circuit requirements.

And yet another and further objective of this invention is to provide means, associated with an electrical connector, for the elimination of the effects of undesired stray signals in its circuit or circuits, which can be readily changed and substituted in the connector by other such means of a different rating or effectiveness according to requirement.

It has been found that so-called "soft" ferrite elements, as they are known in this art, when properly included in an electrical circuit, act as an electromagnetic "sponge" to absorb and dissipate the unwanted electromagnetic wave energy of the conductor or conductors with which the ferrite element is associated.

DETAILED DESCRIPTION OF THE INVENTION

Figure 1:
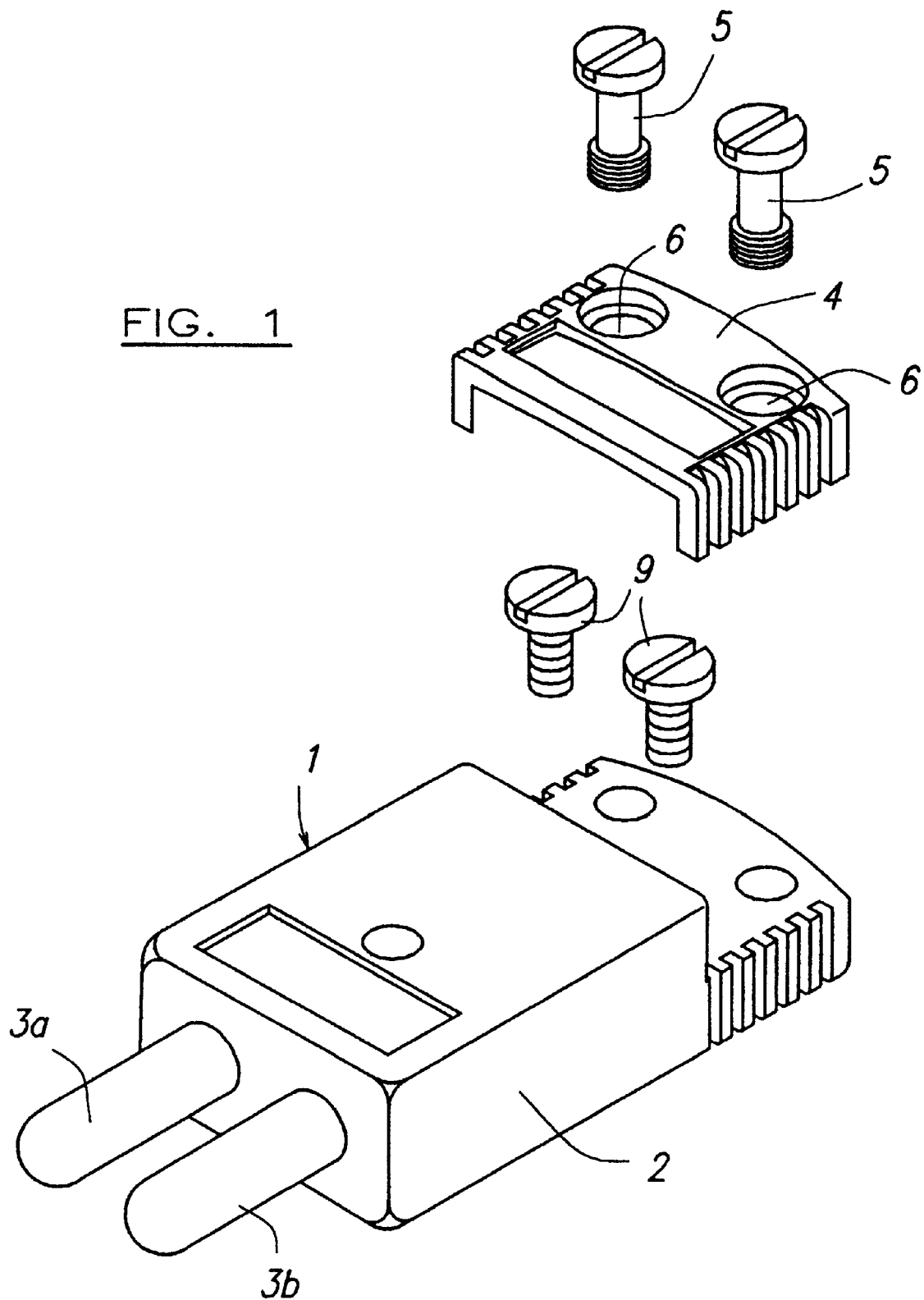
FIG. 1 is a perspective elevation, with parts shown in separated condition, of a two-pin male plug suitable for connecting a lead (not shown) to a female socket provided, say, on another lead or on an article of apparatus.
Figure 2:
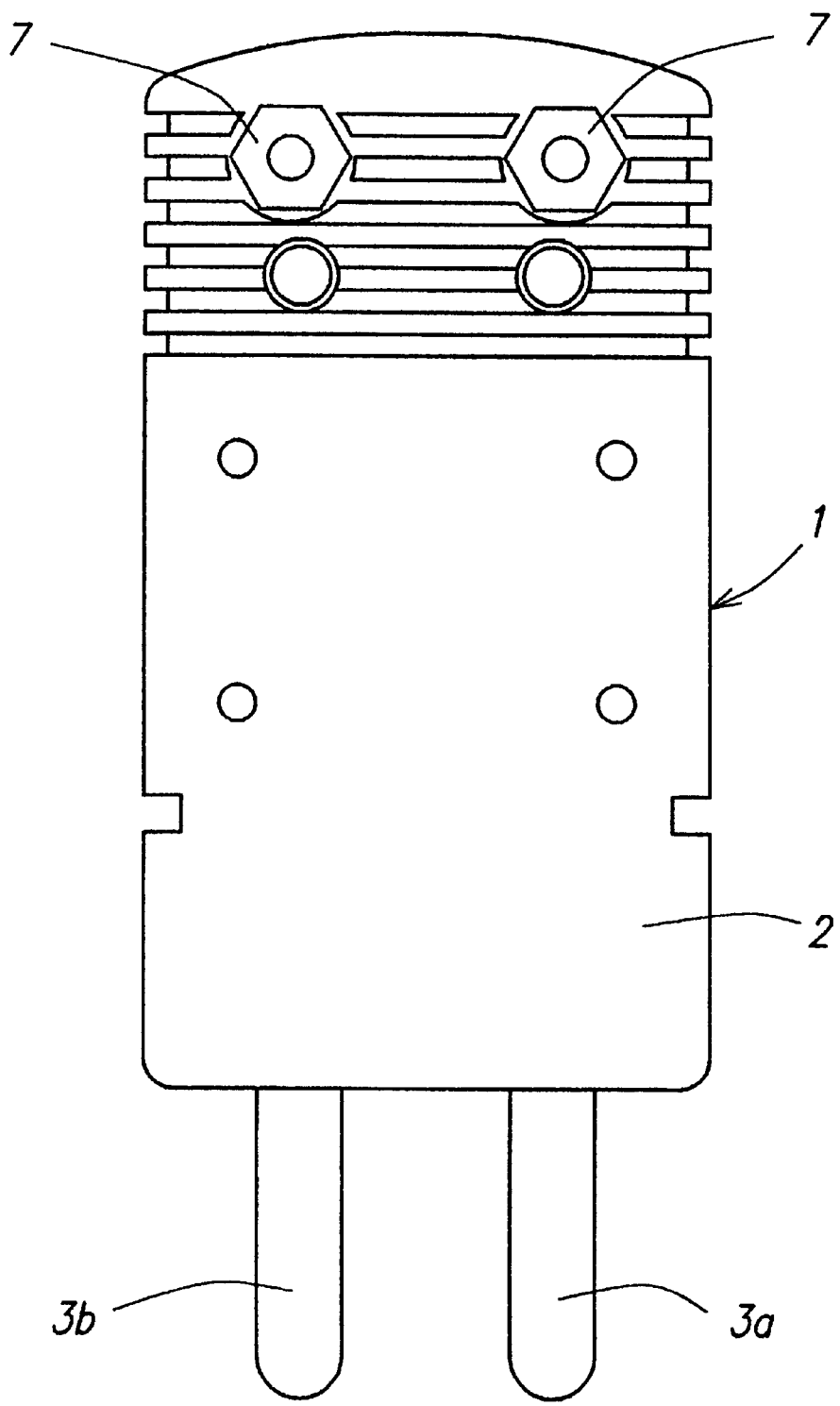
FIG. 2 is an underplan view of the plug of FIG. 1.
Figures 3, 4:
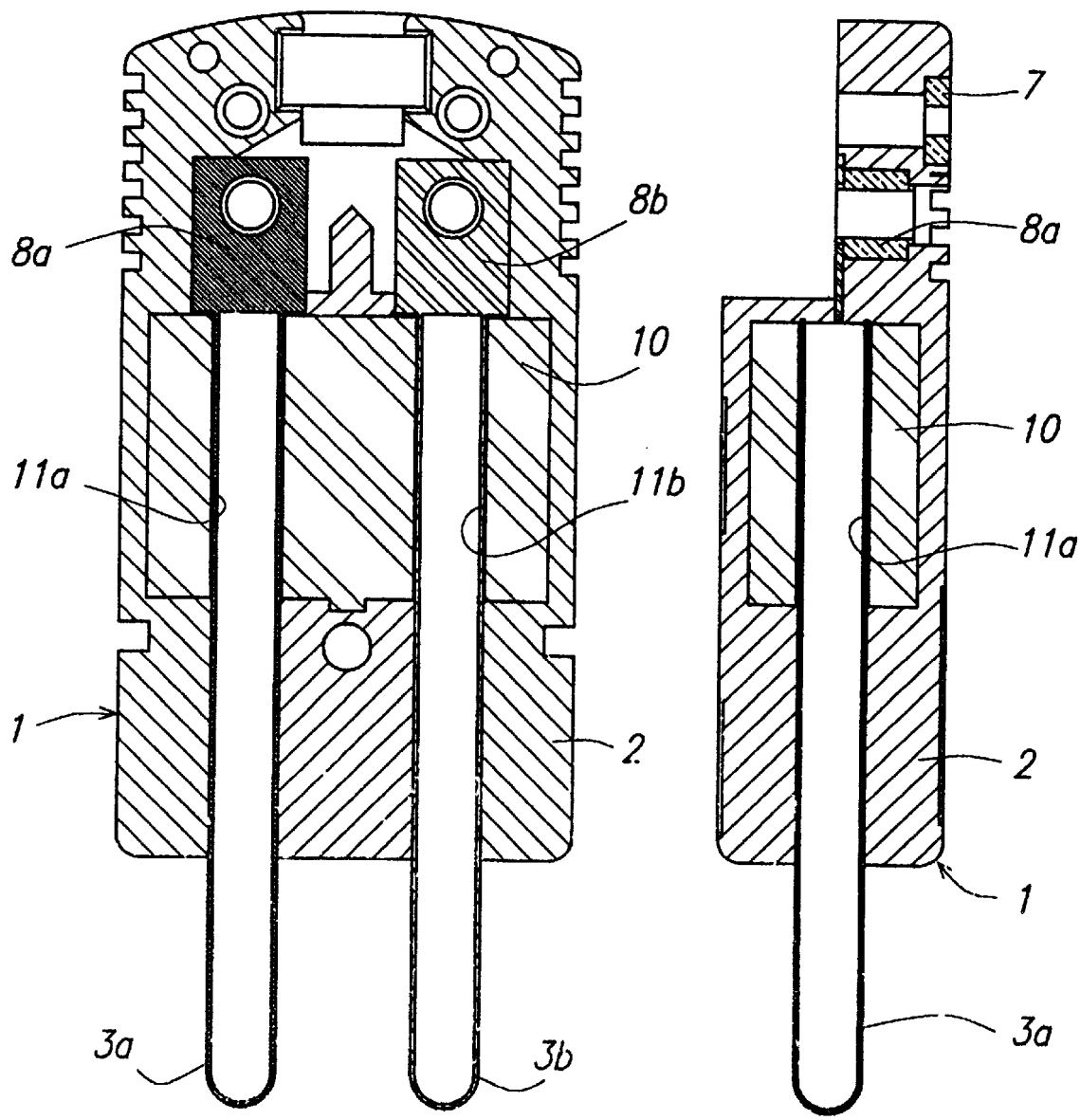
FIG. 3 is a section, taken in a first plane, through the plug of FIGS. 1 and 2.
FIG. 4 is a section, taken on a second plane at right angles to the plane of FIG. 3, of the plug of FIGS. 1 and 2, with a cover portion omitted.
Figure 5:
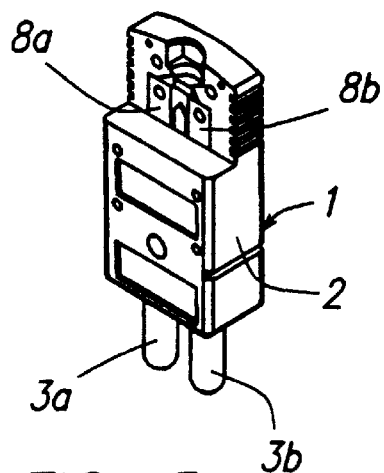
FIGS. 5 and 6 are respectively perspective views, of the plug of FIGS. 1 and 2, seen from different angles, and with the cover portion omitted.
Figure 6:
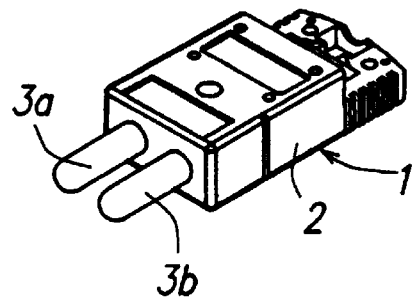
Figure 7:
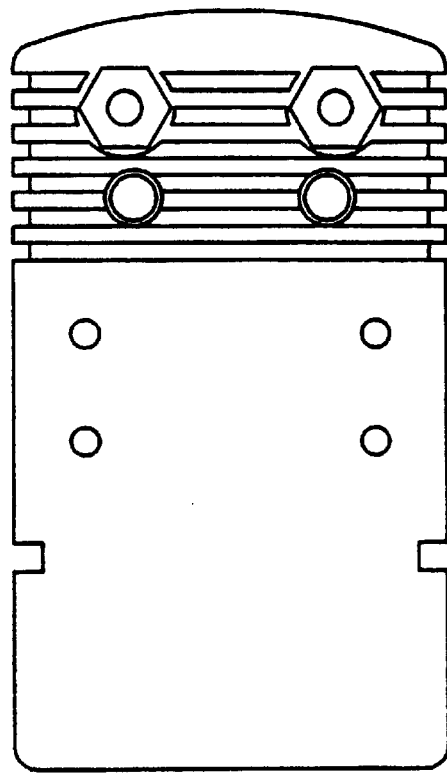
FIG. 7 is an elevation of a female socket intended to co-operate with the male plug of FIGS. 1 and 2.
Figure 8:
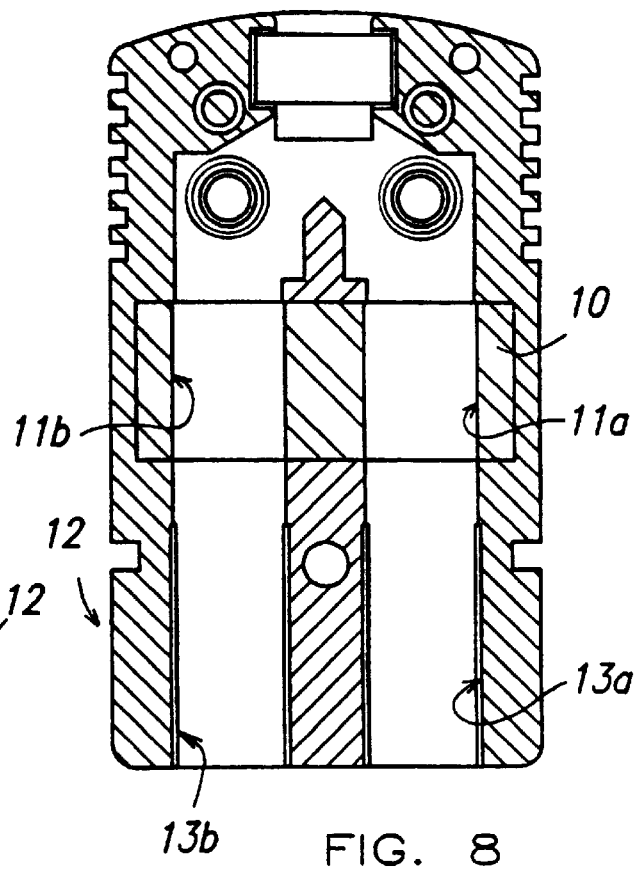
FIG. 8 is a section, taken in a first plane, through the socket of FIG. 7.
Figure 9:
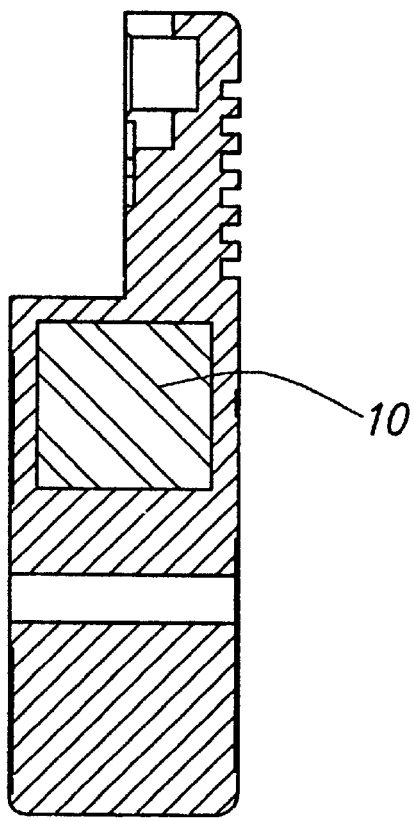
FIG. 9 is a section, taken on a second plane at right angles to the plane of FIG. 8, of the female socket of FIG. 7, with a cover portion omitted.
Figure 10:
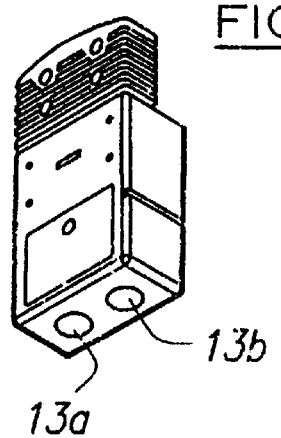
FIGS. 10 and 11 are respectively perspective views, of the female socket of FIG. 7, seen from different angles and with a cover portion omitted.
Figure 11:
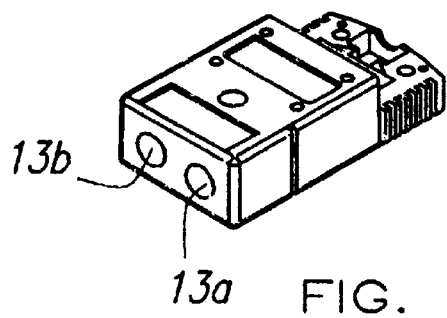
Figure 12:
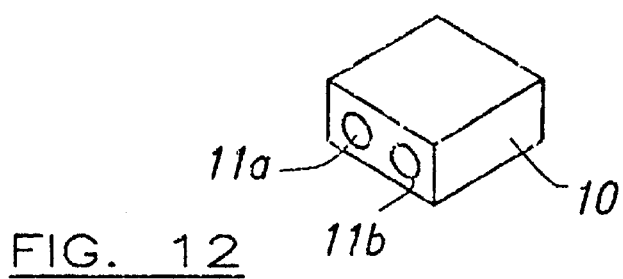
FIG. 12 is a perspective elevation of a ferrite block, as seen also in FIGS. 3,4 8 and 9.

Referring to FIG. 1 of the drawings, there is shown a male plug 1 having a body 2 serving as a mounting for pins 3a and 3b of respectively different diameters, so as to ensure that the plug can only be interconnected with a socket in the correct position. A removable cover 4 can be secured in position on the plug body 2 by means of fixing screws 5 passed through holes 6 in the cover 4 and engaging into threaded fixtures 7 in the body 2. In the body 2, at a position below the cover 4 when it is attached, there are provided threaded terminals 8a and 8b to which wire leads can be attached by screws 9. The terminals form part of the respective pins 3a and 3b.

Within the body 2 there is housed a block 10 of ferrite material. The block 10 is provided with through passages 11a, 11b of respectively different diameters to permit mounting through the block of the two pins 3a, 3b of the plug. Accordingly, each of the conductors (pins 3a, 3b) of the plug is totally surrounded by the ferrite material, and the block 10 can readily be made of suitably large dimensions to ensure that proper shielding is obtained. Referring now to FIGS. 7, 8, 9, 10, 11 and 12, there is shown a female socket 12 which is largely similar in construction to the male plug 1 of FIGS. 1 to 6, except that the pins 3a, 3b of the plug are replaced by tubular sockets 13a, 13b of respectively different internal diameters, adapted to receive the respective pins 3a, 3b of the male plug. Here again, the internal conductors of the socket (i.e. the sockets 13a, 13b) pass through and are entirely surrounded by the block 10 of ferrite material. It will readily be appreciated that the invention is not restricted to two-conductor plugs and sockets, but could be used in single-conductor items, or in items having more than two conductors, e.g. other multiple pin plugs and sockets. As the protection, by ferrite material, is provided by a simple apertured block (the block 10), it is possible to vary the composition of the material of the block 10 according to need, and simply insert a block of appropriate composition for the use intended.

The block may be housed releasable in the body of the plug or socket, or may be permanently included therein during the process of molding of the body.

I claim:

1. In an electrical connector assembly comprising a plug having a housing body; only two projecting electrical connector pins, each pin having a tip, a connecting terminal attached to a wire and a shank, and extending in parallel through said body; a ferrite block within said housing body; the connecting terminals being on inner ends of said pins within said body, the improvement comprising:

passages, each of different diameter in said block through which each pin is inserted, according to the diameter of each pin, to surround the shank of each pin.

2. The assembly of claim 1 in which said pins extend beyond the body.

* * * * *